United States Patent [19]
Fish

[11] Patent Number: 5,482,015
[45] Date of Patent: Jan. 9, 1996

[54] DEVICE FOR COUPLING RECIPROCATING AND ROTATING MOTIONS

[76] Inventor: Robert D. Fish, 3000 S. Augusta Ct., La Habra, Calif. 90631

[21] Appl. No.: 274,395
[22] Filed: Jul. 11, 1994
[51] Int. Cl.$^6$ .................................................. F02B 75/32
[52] U.S. Cl. ....................................................... 123/197.4
[58] Field of Search ........................... 123/197.3, 197.4, 123/197.2, 58.1, 90.11, 78 F; 74/52; 92/140; 475/11, 331

[56] References Cited

U.S. PATENT DOCUMENTS

| | | | |
|---|---|---|---|
| 1,431,617 | 10/1922 | Young | 123/197.2 |
| 3,693,464 | 9/1972 | Wieckmann | 123/197.4 |
| 3,886,805 | 6/1975 | Koderman | 123/197.4 |
| 4,096,763 | 6/1978 | Kell | 475/331 |
| 4,535,730 | 8/1985 | Allen | 123/78 F |
| 4,966,043 | 10/1990 | Frey | 123/197.4 |
| 5,115,782 | 5/1992 | Klinke et al. | 123/90.11 |
| 5,158,047 | 10/1992 | Schaal et al. | |
| 5,170,757 | 12/1992 | Gamache | 123/197.4 |
| 5,245,962 | 9/1993 | Routery | 123/197.3 |

FOREIGN PATENT DOCUMENTS

| | | | |
|---|---|---|---|
| 3233314 | 3/1984 | Germany | 123/197.4 |
| 3443701 | 6/1986 | Germany | 123/197.3 |

Primary Examiner—Marguerite J. Macy

[57] ABSTRACT

A crank pin is carried on a planetary gear such that the crank pin traces out a substantially triangular or other path having a relatively long flattened portion. In an internal combustion engine, motorized vehicle or other device in which a piston reciprocates inside a cylinder and fuel is combusted within the cylinder, the crank pin is coupled to the piston, and the movement of the crank pin is timed such that the crank pin travels within the flattened portion of the path during at least some part of the main burning period.

6 Claims, 3 Drawing Sheets

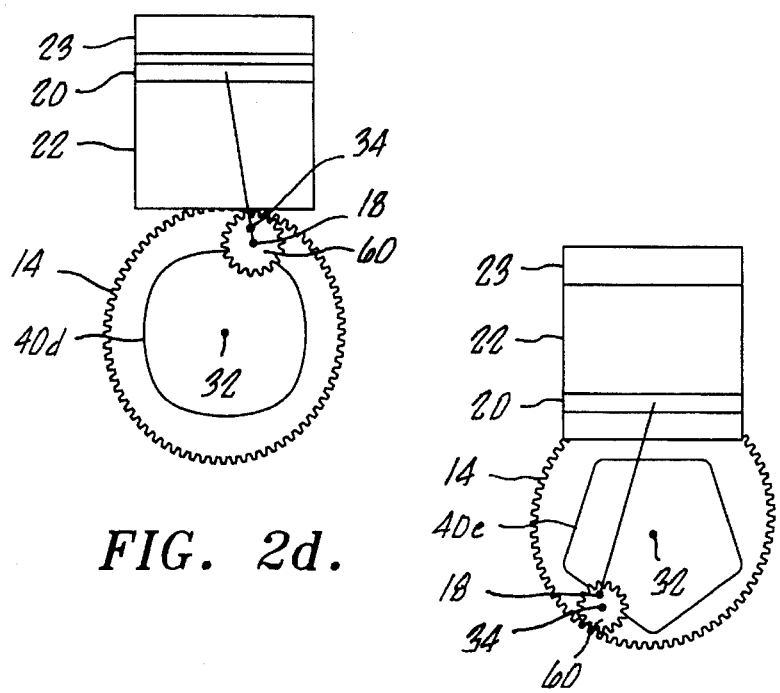
FIG. 2d.
FIG. 2e.
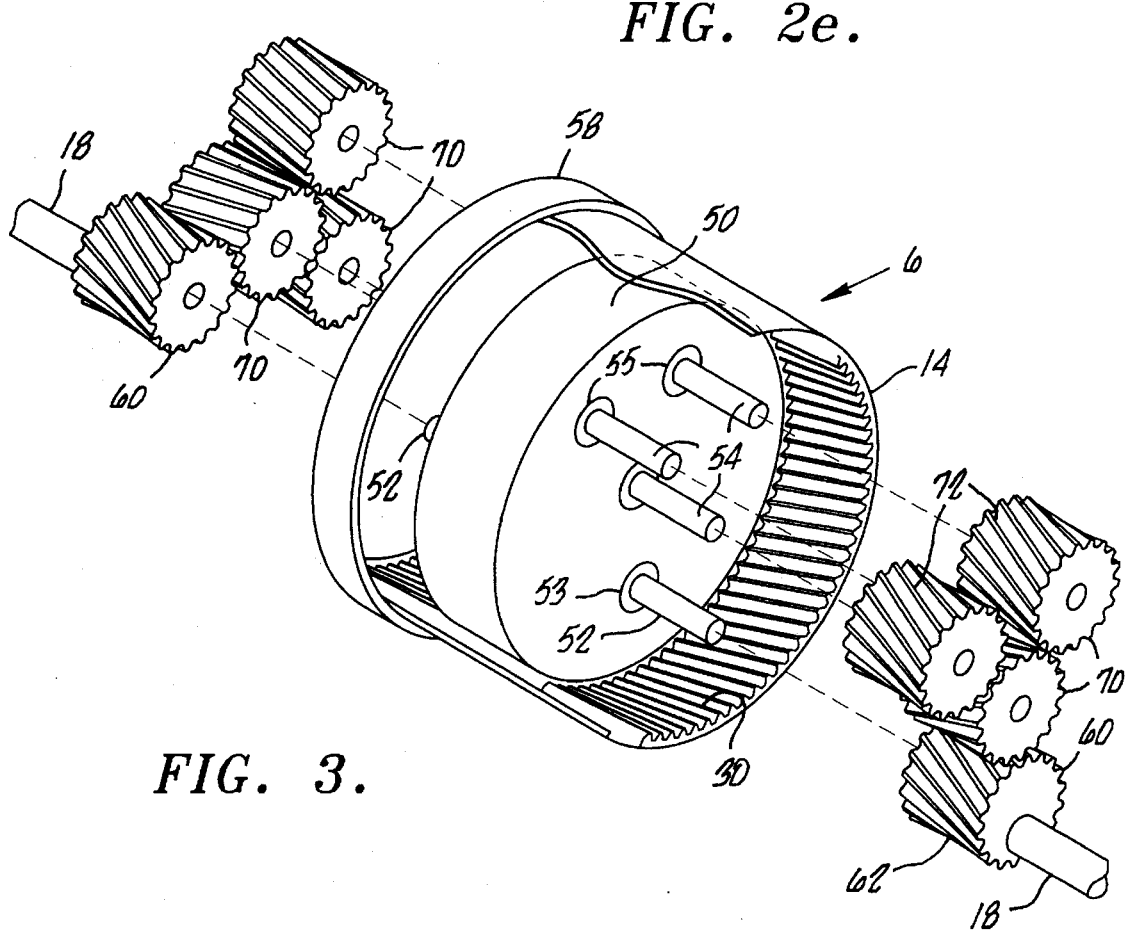
FIG. 3.

5,482,015

DEVICE FOR COUPLING RECIPROCATING AND ROTATING MOTIONS

FIELD OF THE INVENTION

The present invention relates to devices which couple reciprocating and rotating motions, including crankshafts, internal combustion engines, and motorized vehicles.

BACKGROUND OF THE INVENTION

A conventional internal combustion engine uses a crankshaft to couple the reciprocating motion of a piston with the rotating motion of a drive shaft. In such devices the piston is coupled to a crank pin via a connecting rod, and the crank pin is carried on a crank arm in a circular orbit about the central axis of the crankshaft. The crankshaft in turn is coupled to the drive shaft. In many engines and motorized vehicles, multiple pistons are coupled to the same crankshaft.

Internal combustion engines typically produce power by combusting a charge of fuel such as gasoline or diesel inside the cylinder. Theoretically, the efficiency of an engine can be maximized by instantaneously combusting the entire charge at top dead center (TDC), i.e, when the volume of space defined by the piston and the cylinder is at a minimum. In practice, however, this is difficult or impossible to accomplish. Modern engines compensate for the time it takes to combust the charge by beginning combustion before top dead center (BTDC), and in some cases well before top dead center. In modern gasoline engines the charge may be ignited with a spark plug anywhere from 5 degrees to more than 60 degrees BTDC, with a greater advance being required to compensate for higher engine speed. This is commonly referred to as spark advance. Diesel engines utilize a corresponding combustion advance without a spark, but in diesel engines the charge detonates rather than burns, and therefore less advance is required. The smaller advance in diesel engines is generally regarded as a significant factor in the greater efficiency of diesel engines relative to gasoline engines.

One of the drawbacks to beginning combustion before top dead center is that work generally must be expended compressing the combusting gas—the greater the advance, the more energy is expended. The amount of energy expended in this manner may be quite significant, and many improvements have been directed at reducing the time it takes for combustion to occur. For example, efficiency has been increased somewhat by more accurately controlling the fuel mixture through the use of fuel injection; by swirling and atomizing the injected fuel to improve its mixing with air inside the cylinder; and by using side chambers in which an especially rich fuel mixture can be quickly ignited. Despite these improvements combustion of 90% of the charge may still require at least 30–50 degrees of crank angle at about 1200 RPM, and even more crank angle at higher speeds. Moreover, even with a relatively large combustion advance, a significant portion of the charge may still be combusted after top dead center, which further reduces efficiency.

Thus, there is a further need to minimize the negative effects of combustion duration. This is especially important with respect to motorized vehicles including, for example, automobiles, planes and boats, in which inefficiency is associated with considerable monetary and pollution costs.

SUMMARY OF THE INVENTION

In the present invention the crank pin of a crankshaft, internal combustion engine or motorized vehicle traces out a path which reduces piston displacement relative to a conventional engine, during at least part of the main burning period. This is accomplished by coupling the crank pin to an eccentric and causing the eccentric to rotate about a peripheral axis while revolving about a central axis. The relative size and timing of the rotation and revolution may be manipulated to yield a substantially triangular, quadrilateral, pentagonal or other path having a relatively long flattened portion, which in turn provides the reduced piston displacement. In multiple cylinder engines, eccentrics connected to adjacent pistons may be coupled together with a connector piece. Oversized cylinders may also be used with either fixed or variable inlet porting.

BRIEF DESCRIPTION OF THE DRAWINGS

In the drawing, wherein similar reference characters denote similar elements throughout the several views:

FIG. 2a is a schematic of an internal gear meshing with an eccentric in which the crank pin traces out a substantially triangular path.

FIG. 2b is a schematic of an internal gear meshing with an eccentric in which the crank pin is positioned relatively close to the peripheral axis.

FIG. 2c is a schematic of an internal gear meshing with an eccentric in which rotation of the eccentric has been retarded approximately 35 degrees relative to the eccentric of FIG. 1a.

FIG. 2d is a schematic of an internal gear meshing with an eccentric in which the crank pin traces out a substantially quadrilateral path.

FIG. 2e is a schematic of an internal gear meshing with an eccentric in which the crank pin traces out a substantially pentagonal path.

FIG. 3 is a cutaway exploded schematic of a generalized inside segment.

DETAILED DESCRIPTION OF THE DRAWING

Figure 1:
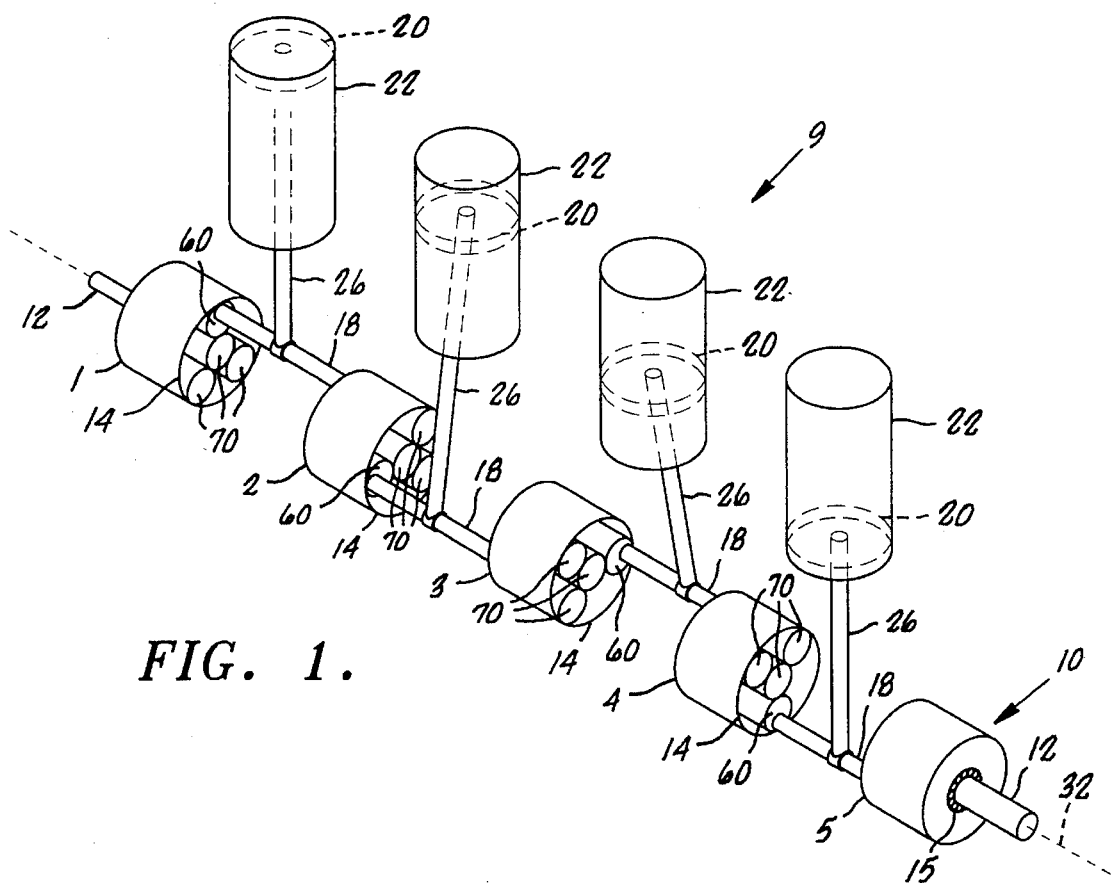
FIG. 1 is a schematic of an internal combustion engine according to one embodiment of the invention.

In FIG. 1 an internal combustion engine 9 has four cylinders 22 in which pistons 20 reciprocate. Each of the pistons 20 is coupled to an eccentric gear 60 through a connecting rod 26 and a crank pin 18. The eccentric gears 60 are smaller than, and mesh with, internal gears 14 in a planetary relationship such that each of the eccentric gears 60 rotates about its own peripheral axis 34 (see FIGS. 2a–2e) while revolving about the central axis 32 of one of the internal gears 14. Because of the planetary relationship, eccentric gears 60 may sometimes be referred to herein as planetary gears. Stabilizing gears 70 assist in maintaining the relative positions of the eccentric gears 60 and the internal gears 14.

As used herein, reciprocation refers to cyclical movements in which at least part of the movement is retraced during a single cycle, rotation refers to an object turning about an internal axis, (an axis passing through the object), and revolution refers to an object moving in an orbit about an external axis, (an axis which does not pass through the object). Where a single object has a compound motion in which it both rotates and revolves, the axis of rotation is sometimes referred to as the peripheral axis, and the axis of revolution is sometimes referred to as the central axis. Also as used herein gear size refers to the effective gear size determined by the pitch diameter.

Figure 4:
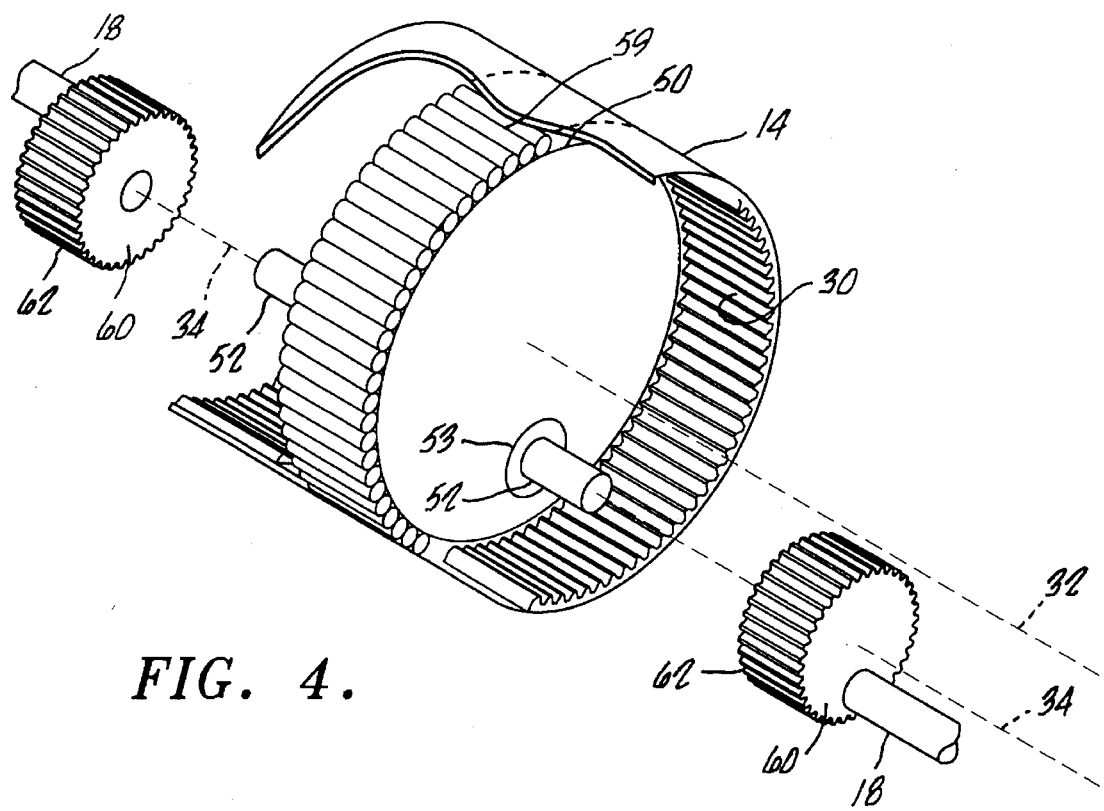
FIG. 4 is a cutaway exploded schematic of an alternative inside segment.

The crankshaft 10 of engine 9 comprises segments 1–5, each of which includes at least one internal gear 14, an eccentric gear 60 and a connector piece 50 (see FIGS. 3–4). Connector pieces 50 interconnect adjacent eccentric gears 60 (those having no intervening crank pin 18) of segments 2–4, and connect eccentric gears 60 of outside segments 1 and 5 to drive shaft 12. Crankshaft 10 is sometimes referred to herein as a compound crankshaft because it includes parts which move relative to each other.

In FIG. 1 internal gears 14, eccentric gears 60, and stabilizing gears 70 are depicted schematically without teeth to simplify the drawing, and to reflect the fact that toothed gears are not strictly necessary. For example, internal gears 14 could be toothed belts in which the teeth are facing inward, and in some applications it may be possible to use smooth toothless "gears" having one or more notches or other means to maintain the timing of the eccentric 60 within the internal gear 14.

Segments 2, 3, and 4 are sometimes referred to herein as inside segments because they have internal gears 14 on both ends. Inside segments can accommodate two separate reciprocating motions, and are generally timed such that the reciprocating motions are out of phase with each other to achieve balance in the entire crankshaft 10. Thus, in the engine 9 of FIG. 1 having four separate pistons 20, the piston 20 immediately to the right of segment 1 is at top dead center, while the piston 20 immediately to the right of segment 2 is 90 degrees of crank angle before top dead center. Pistons 20 immediately to the right of segments 3 and 4 are correspondingly timed so that the entire crankshaft 10 is balanced. The relative timing of such segments will depend on how many separate reciprocating motions are involved, and there are many equivalent permutations which will achieve overall balance.

Segments 1 and 5 are sometimes referred to herein as outside segments because they each have an internal gear 14 on one end, and a main bearing 15 on the other end. Such outside segments accommodate only one reciprocating motion. In FIG. 1, drive shaft 12 extends through the main bearings 15 of both segments 1 and 5 to provide power to a transmission or for other use. Drive shaft 12 could, however, be made to extend from only one of segments 1 and 5.

Figures 2A, 2B, 2C:
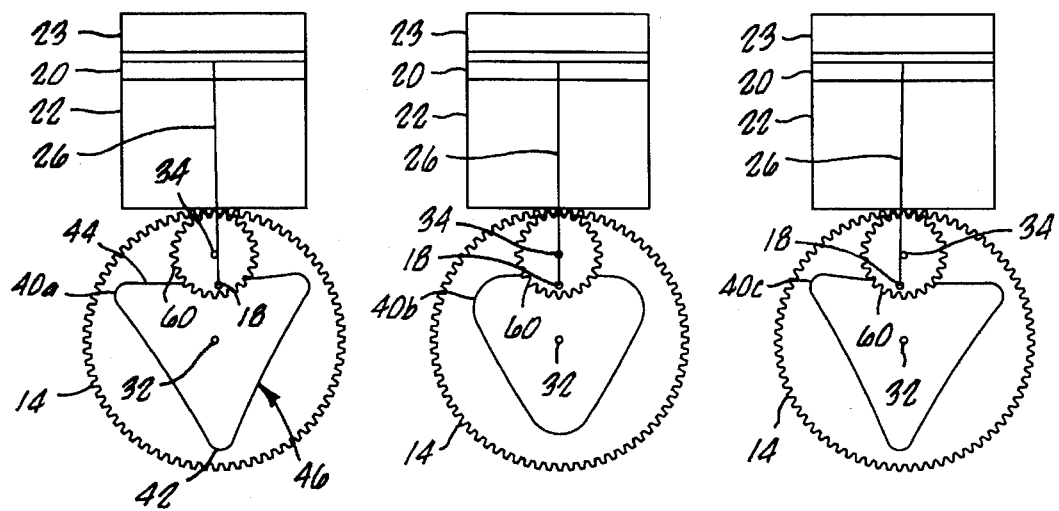

In FIG. 2a, the eccentric gear 60 is one-third (⅓) the size of the internal gear 14, and carries crank pin 18 in a substantially triangular path 40a, with one of the points 42 of the triangle pointing more or less away from cylinder 22, and one of the sides 44 of triangle running relatively close to, and approximately parallel to, the bottom of the cylinder 22. This provides a relatively long flattened path during the main burning period of combustion, and in turn allows combustion to take place over a significant crank angle with relatively little change in displacement of the piston 20. The main burning period of combustion is taken to be the crank angle required for the fraction from 10% to 90% of the charge to be combusted. (See Weaving, John H., ed., *Internal Combustion Engineering: Science & Technology*, page 9 (Elsevier Applied Science Publ. Ltd. 1990)). As described more fully herein, the reduction of piston displacement during the main burning period reduces energy losses from compressing the combusting gas on the compression-stroke, and also increases the energy available on the power-stroke.

An eccentric 60 one third the size of the internal gear 14 is preferred because it produces a path 40 having an especially long flattened portion. Other configurations are also possible. For example configurations are possible in which the eccentric gear 60 is one fourth or one fifth the size of the internal gear 14. These configurations yield substantially polygonal paths such as quadrilateral and pentagonal paths respectively, with the shape of the path approaching circular as the size of the eccentric gear 60 becomes smaller relative to the size of internal gear 14.

The angularity of crank path 40 is influenced by the positioning of crank pin 18 on eccentric 60. This is important because it affects both the amount of vibration and the overall efficiency. More angular paths tend to increase efficiency but also tend to cause more vibration. With crank pins having substantially polygonal paths, the angularity of the path may be modified by positioning the crank pin 18 closer to or farther from the peripheral axis 34 of the eccentric 60.

A comparison of FIGS. 2a and 2b demonstrates this effect for an eccentric having a radius of 1.2 inches. In FIG. 1a positioning the crank pin 18 on eccentric 60 at 0.95 inches from the peripheral axis 34 produces a substantially triangular path 40a with concave sides. In FIG. 2b positioning the crank pin 18 at 0.4 inches from the peripheral axis 34 yields a substantially triangular path 40b with convex sides. Such paths are, of course, not mathematically triangular, but are considered herein to be substantially triangular because they appear to be more triangular than quadrilateral, pentagonal or some other regular polygonal path.

The entire crank path may also be rotated by manipulating by the relative timing of the rotation and revolution of eccentric 60 with respect to internal gear 14. This is important because it affects piston displacement during the main period of combustion. Comparison of FIGS. 2a and 2c demonstrates this effect. In FIGS. 2a and 2b both eccentrics 60 are revolving clockwise about central axis 32, and both have traveled to a point where the respective peripheral axes 34 are directly above central axis 32. The rotation of eccentric 60 in FIG. 2a, however, is advanced approximately 5 degrees such that the crank pin 18 is slightly to the right of a vertical line extending from central axis 32, and the rotation of eccentric 60 in FIG. 2c is retarded approximately 30 degrees such that the crank pin 18 is slightly to the left of a vertical line extending from central axis 32.

FIGS. 2d and 2e depict alternative embodiments in which the crank pins 18 trace out substantially quadrilateral and pentagonal paths 40d and 40e, respectively. The quadrilateral path of FIG. 2d may be especially useful in two-stroke engines because in addition to having a relatively long flattened portion near top dead center, there is a relatively long flattened portion near bottom dead center. This should provide additional time to expel combusted gasses and begin the intake of fresh air and fuel. It may be noted that the connecting rods in FIGS. 2d and 2e are shorter than those in FIGS. 2a, 2b and 2c, but may be made longer so that the internal gears 14 do not overlap the cylinders 22.

Oversized cylinders—those having excess displacement over and above that required for combustion—may be used advantageously in conjunction with one or more of the devices and principles disclosed herein. To assure that a proper amount of air is mixed with the charge in such cylinders, either the air inlet valve(s) may be timed to close at a fixed crank angle part-way down the intake stroke, or preferably a variable inlet porting system may be used in which the crank angle over which the air inlet valve(s) are left open varies according to operating conditions. In either case, when sufficient air has been drawn in, the inlet valve(s) are closed, resulting in a relative vacuum for the remainder of the inlet stroke. FIG. 2a is a representation of simulation CC3-i1 described more fully below, and shows an exemplary oversized cylinder 22. At a crank speed of 1200 RPM and relative throttle of 0.75, the approximate calculated position at which the air inlet valve(s) would close is depicted by arrow 46.

Where a variable inlet porting system is used to alter the point at which the air intake valve(s) close, the point of closure may be electronically, hydraulically, mechanically or in some other manner varied to accommodate changes in operating conditions. For example, variable porting may be used to compensate for many conditions including temperature, altitude and load changes, or to achieve a "turbo" effect.

The bottom surface of the cylinder heads 23 in FIGS. 2a–2e are preferably bowl-shaped (concave) or "bathtub shaped" in the vicinity of the center of piston 20, and either flat or relatively flat elsewhere. This may increase efficiency by producing a more efficiently shaped cavity for combustion, and may be particularly useful with devices described herein because the top surface of the piston 20 can come very close to the bottom surface of the cylinder head 23, and would otherwise produce a relatively thin, pancake shaped combustion space.

Exact specifications for the shape of the cylinder head, as well as the number of cylinders, cylinder diameter, stroke length, fuel mixture, timing, and other parameters cannot be set forth for all conditions because they depend upon a multitude of factors including load range and duty factor, type of fuel and ignition system, and materials from which the engine is manufactured. However, the necessary engineering lies well within the skill of those in the art. (See e.g., Taylor, Charles Fayette, *Internal Combustion Engine in Theory and Practice*, volumes 1 and 2 (1985)).

FIG. 3 shows a generalized inside segment 6, similar to segments 2, 3 and 4 of FIG. 1. In this view, internal gear 14 has teeth 30 which mesh both with teeth 62 of eccentric 60 and teeth 72 of stabilizing gears 70. The exact specifications of teeth 30, 62, and 72 may depend on the application, and determination of such specifications is well within the ordinary skill of the art. See, for example, the engine described in Koderman, U.S. Pat. No. 3,886,805. In a preferred embodiment, straight-cut teeth of 6–24 diametrical pitch are used. Helical, herringbone and other teeth may have some advantages such as increased load bearing and decreased binding, but straight cut teeth are presently preferred in part because they are easier to manufacture and install. A 20 degree pressure angle is recommended for increased load bearing, although a 14 degree or other pressure angle may be used.

Teeth 30 may be manufactured according to standard techniques, including cutting, shaping and grinding the teeth 30 from each end, or broaching. Thus, although teeth 30 are shown as extending only part way from each end of segment 6, the teeth 30 could extend farther than shown in FIG. 3, and could extend all the way through segment 6. It may be desirable, but is not necessary for the teeth 30 on one end of a segment to be aligned with teeth 30 on the other end of a segment.

The relative positions of eccentric gear 60, stabilizing gears 70, and internal gear 14 are maintained in part by connector piece 50, acting through posts 52 and 54. One end of each post 52 is pressed into one of the eccentric gears 60, and the other end is pressed into a bearing 53. Bearings 53 are pressed into connector piece 50. An analogous relationship applies to posts 54, stabilizing gears 70, and bearings 55. The term, pressed, is here used in a broad sense to include parts which are formed or placed together, and maintained in a juxtaposed relationship by some combination of friction, welding, adhesive, pins or other means. The relative positions of gears 14, 60, 70 may be further maintained by lip 58, which may be pressed onto the ends extending from segment 6 after gears 60 and 70 are installed. For simplicity, lip 58 is only shown in FIG. 3, and only on one end of segment 6.

In FIG. 3, connector piece 50 is depicted as a symmetrical disk having a rounded perimeter. Such a symmetrical shape is not strictly necessary. In some applications, the connector piece 50 may have a non-symmetrical shape, and may be weighted to enhance the balance of the compound crankshaft 10 as a whole. Also, the crank pins 18 of segment 6 are depicted as being 90 degrees out of phase with each other. It should be understood that other phase angles including 60 degrees or 45 degrees (as in a six cylinder or an eight cylinder engine respectively) are possible.

In FIG. 4, an alternative embodiment is shown in which the connector piece 50 is circumferentially supported by bearing 59, with a concomitant elimination of stabilizing gears 70, posts 54 and bearings 55. In this configuration, as in FIGS. 1 and 3, teeth 30 on opposite sides of connector piece 50 are generally staggered to achieve balance, and therefore do not extend completely through the connector piece 50.

In another alternative embodiment (not shown), the eccentric gear 60 can be made to travel about the circumference of an external gear rather than along a track inside an internal gear. Since it likely would still be desirable to have the eccentric gear 60 rotate in an opposite direction to its revolution, (i.e., counterclockwise to clockwise or visa versa), an intermediate gear would then be interposed between the stationary gear and the eccentric gear.

Figure 5:
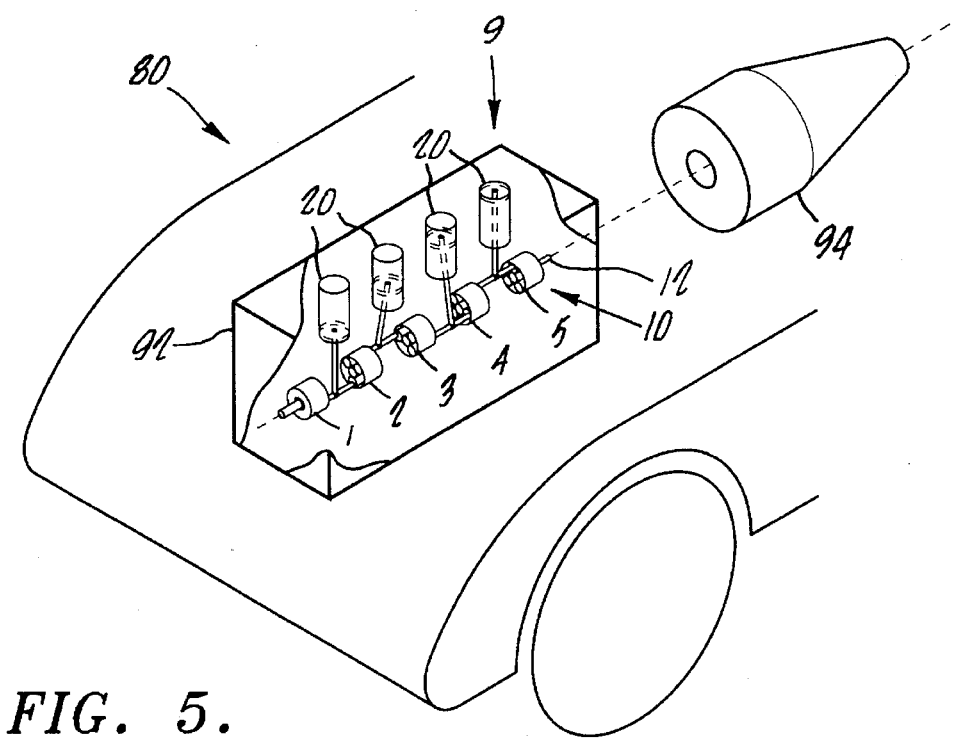
FIG. 5 is a schematic of the front end of an automobile according to one embodiment of the invention.

In FIG. 5 an automobile 80 (of which only the front portion is shown) has an internal combustion engine 9 with four pistons 20 coupled to compound crankshaft 10. As described above, the compound crankshaft 10 has four segments 1–5, and both cylinders 22 and segments 1–5 are supported by, or carved out of, an engine block 92. A transmission 94 transmits power from drive shaft 12 to an axle (not shown) and rear wheels (not shown).

COMPUTER SIMULATIONS

Computer simulations demonstrate some of the potential gains in efficiency arising from the devices and principles disclosed herein. These simulations are intended to provide only rough comparisons among the different simulated engines, but are accurate enough to demonstrate significant improvement over existing art. Differences in friction, for example, were not taken into account in any manner. Simulation was performed using Windows™ version 1.0 of Working Model™ by Knowledge Revolution (15 Brush Place, San Francisco, Calif. 94103, Tel. (415) 553-8153), with calculations based upon Euler integration with a fixed internal time step of 1/3000th of a second. Distance is given in inches, volumes in cubic inches, pressure in pounds per square inch, angles in degrees, spark advance in degrees before top dead center, work in foot-pounds per four-stroke cycle, and engine speed in revolutions per minute (RPM). The designation CONV ("conventional") refers to a simulated hypothetical prior art engine, while the designations CC3-i1, CC3-i3, CC4 and CC5 refer to simulated hypothetical engines according to one or more of the claimed inventions. The crank pins of CC3-i1 and CC3-i3 trace out substantially triangular paths similar to those shown in FIG. 1a, while the crank pins of CC4 and CC5 trace out substantially quadrilateral and pentagonal paths similar to those shown in FIGS. 1d and 1e respectively. Chart 1 summarizes the basic structural parameters used in simulating the five engines.

CHART 1

STRUCTURAL SIMULATION PARAMETERS

| Parameter | CONV | CC3-i1 | CC3-i3 | CC4 | CC5 |
| --- | --- | --- | --- | --- | --- |
| Bore | 4.9 | 5.6 | 5.0 | 5.0 | 5.0 |
| Stroke | 3.5 | 4.8 | 4.0 | 4.3 | 4.8 |
| Min Cyl. Vol. | 10.1 | 7.6 | 8.1 | 7.3 | 12.2 |
| Max Cyl. Vol. | 76.5 | 125.5 | 86.4 | 91.5 | 106.0 |
| Radius Of Internal Gear | n/a | 3.6 | 3.0 | 3.0 | 3.0 |
| Radius Of Eccentric | n/a | 1.2 | 1.0 | .75 | .6 |
| Crank Pin Displacement From Axis of Eccentric | n/a | .95 | .9 | .1 | .2 |
| Advance of Eccentric | n/a | 5.0 | 5.0 | 10.0 | 5.0 |
| Eff. Length of Connecting Rod | 4.3 | 7.7 | 6.3 | 5.3 | 5.6 |

Charts 2–6 summarize the results of various simulation runs on the five simulated engines. In all cases the pressure contribution $P_{compr}$ from compressing air inside the cylinder at crank angle $\alpha$ was estimated to be:

$$P_{compr}=14.7(T_{hr}*D_{close}/D_\alpha-1)$$

where $D_{close}$ is 76.5 in$^3$ (the approximate volume of air needed to combust the simulated charge of fuel), $T_{hr}$ is the relative amount of fuel burned per cycle (throttle), and $D_\alpha$ is the piston displacement at crank angle $\alpha$. For ease of comparison, $T_{hr}$ was set to 1.00 wherever feasible, regardless of engine speed. Nevertheless, in some cases the throttle was reduced to keep maximum combustion chamber pressures below about 625 pounds per square inch.

In all simulations the compression ratio was kept at approximately 9:1. This may seem inconsistent with ratios of maximum to minimum cylinder volume greater than 9:1, but it should be remembered that the CC3-i1, CC3-i3, CC4 and CC5 simulations all have excess cylinder capacity so that somewhat less than the maximum cylinder volume of air would be actually compressed.

The pressure contribution $P_{ign}$ from combustion of the air-fuel mixture at crank angle $\alpha$ was estimated to be:

$$P_{ign}=7025*T_{hr}(1-(1/(10^9*T_{ign}^4+1)))/Vol_\alpha$$

where $T_{ign}$ is the time since the start of ignition, and $Vol_\alpha$ is the displacement volume at crank angle $\alpha$. This formula achieves a rough approximation of the following data: (a) the burn curve in Weaving, John H., ed. *Internal combustion Engineering: Science & Technology*, supra, page 8, FIG. 4, and page 39; (b) the pressure-crank-angle diagrams in Taylor, *Internal Combustion Engine in Theory And Practice*, supra, vol. 1, page 39, FIG. 2–5; and (c) the pressure-crank-angle diagram in Holman, Jack P. (ed), *Theory of Machines & Mechanisms*, page 457, FIG. 14-9 (McGraw Hill 1980).

Work was calculated as a running summation:

$$Work_\alpha=\Sigma(P_{compr}+P_{ign})(A)(\Delta D)$$

where A is the working area of the piston and $\Delta D$ is the distance traveled by the piston in the previous time interval. "Rel. Efficiency" is the ratio of work performed in the particular engine relative to work performed in the simulated conventional engine, CONV, for the same engine speed and spark advance, and compensated for throttle changes. For example, at 1200 RPM and a spark advance of 45 degrees BTDC, it was calculated that the simulated conventional engine would produce about 1079 foot-pounds per cylinder per four stroke cycle. At the same speed and advance, but with only about 75% of the fuel consumption, it was calculated that the CC3-i1 simulated engine would produce about 1148 foot-pounds per cycle. The relative efficiency is therefore calculated to be:

$$(1148/0.75)/1079=1.42$$

which corresponds to an estimated improvement in efficiency of approximately 42%. Over the range of trial simulation runs, the CC3-i1 engine showed an estimated improvement in efficiency of between 42% and 80% relative to the simulated conventional engine CONV.

CHART 2

SIMULATION RUNS FOR CONV

| | Run #1 | Run #2 | Run #3 | Run #4 | Run #5 |
| --- | --- | --- | --- | --- | --- |
| Engine Speed | 1200 | 2000 | 3000 | 4000 | 4000 |
| Spark Advance | 45 | 55 | 60 | 75 | 95 |
| Throttle | 1.0 | 1.0 | 1.0 | 1.0 | 1.0 |
| Max Pressure | 592 | 405 | 225 | 181 | 265 |
| Max Work BTDC | 160 | 136 | 120 | 123 | 150 |
| Total Work | 1079 | 955 | 704 | 557 | 678 |

CHART 3

SIMULATION RUNS FOR CC3-i1

| | Run #1 | Run #2 | Run #3 | Run #4 | Run #5 |
| --- | --- | --- | --- | --- | --- |
| Engine Speed | 1200 | 2000 | 3000 | 4000 | 4000 |
| Spark Advance* | 45 | 55 | 60 | 75 | 95 |
| Throttle | .75 | 1.0 | 1.0 | 1.0 | 1.0 |
| Max Pressure | 613 | 603 | 382 | 295 | 394 |

CHART 3-continued

SIMULATION RUNS FOR CC3-i1

|  | Run #1 | Run #2 | Run #3 | Run #4 | Run #5 |
|---|---|---|---|---|---|
| Max Work BTDC | 109 | 152 | 139 | 139 | 158 |
| Total Work | 1148 | 1450 | 1197 | 1000 | 1141 |
| Rel. Efficiency | 1.42 | 1.52 | 1.70 | 1.80 | 1.68 |

CHART 4

SIMULATION RUNS FOR CC3-i3

|  | Run #1 | Run #2 | Run #3 | Run #4 | Run #5 |
|---|---|---|---|---|---|
| Engine Speed | 1200 | 2000 | 3000 | 4000 | 4000 |
| Spark Advance* | 45 | 55 | 60 | 75 | 95 |
| Throttle | .75 | .85 | 1.0 | 1.0 | 1.0 |
| Max Pressure | 621 | 597 | 511 | 403 | 499 |
| Max Work BTDC | 93 | 105 | 130 | 404 | 140 |
| Total Work | 1006 | 1088 | 1100 | 933 | 1042 |
| Rel. Efficiency | 1.24 | 1.34 | 1.56 | 1.68 | 1.54 |

CHART 5

SIMULATION RUNS FOR CC4

|  | Run #1 | Run #2 | Run #3 | Run #4 | Run #5 |
|---|---|---|---|---|---|
| Engine Speed | 1200 | 2000 | 3000 | 4000 | 4000 |
| Spark Advance* | 45 | 55 | 60 | 75 | 95 |
| Throttle | .75 | 1.0 | 1.0 | 1.0 | 1.0 |
| Max Pressure | 598 | 530 | 288 | 242 | 357 |
| Max Work BTDC | 138 | 174 | 151 | 154 | 189 |
| Total Work | 989 | 1165 | 842 | 658 | 813 |
| Rel. Efficiency | 1.22 | 1.22 | 1.20 | 1.18 | 1.20 |

CHART 6

SIMULATION RUNS FOR CC5

|  | Run #1 | Run #2 | Run #3 | Run #4 | Run #5 |
|---|---|---|---|---|---|
| Engine Speed | 1200 | 2000 | 3000 | 4000 | 4000 |
| Spark Advance* | 45 | 55 | 60 | 75 | 95 |
| Throttle | 1.0 | 1.0 | 1.0 | 1.0 | 1.0 |
| Max Pressure | 516 | 372 | 214 | 166 | 241 |
| Max Work BTDC | 115 | 104 | 96 | 97 | 110 |
| Total Work | 1193 | 1061 | 787 | 624 | 765 |
| Rel. Efficiency | 1.11 | 1.11 | 1.12 | 1.12 | 1.11 |

*TDC in the simulations for CC3-i1, CC3-i3, CC4 and CC5 was calculated to occur at approximately 7.0, 9.4, 1.0 and 3.3 degrees, respectively, after the central axis of the eccentric passes the top of the internal gear.

Computer simulations also demonstrate the differences in piston displacement caused by flatness in the paths of the respective crank pins in the simulated engines, CONV, CC3-i1, CC3-i3, CC4 and CC5. Chart 7 summarizes the results. Percent piston displacement (PPD) is the maximum displacement of the piston over the specified crank angle, given as a percentage of the total stroke length. For purposes of Chart 7, the crank angle over which the PPD is determined is centered approximately at TDC, however, PPD can be determined over any range of crank angles. As with the previous simulations, these data are only rough approximations.

CHART 7

Percent Piston Displacement

| Angle | CONV | CC3-i1 | CC3-i3 | CC4 | CC5 |
|---|---|---|---|---|---|
| 15° | .60 | .17 | .14 | .52 | .22 |
| 30° | 2.4 | .71 | .57 | 2.1 | .95 |
| 60° | 9.3 | 2.6 | 2.2 | 8.2 | 5.0 |
| 90° | 19.9 | 5.3 | 4.2 | 18.0 | 10.6 |
| 120° | 32.9 | 7.9 | 5.9 | 30.9 | 29.8 |

Based on this data, the path taken by a crank pin is considered to have a relatively long flattened portion if a piston coupled to the crank pin by a connecting rod would be displaced by a percentage of total stroke length less than or equal to at least one of the following:

1.8% over a 30° range of crank angles;
7.0% over a 60° range of crank angles;
14.9% over a 90° range of crank angles;
24.7% over a 120° range of crank angles.

These numbers correspond to roughly 75% of the PPD in the simulated conventional engine, CONV. Also as used herein, the path taken by a crank pin is considered to have a relatively long and extremely flattened portion if a piston coupled to the crank pin by a connecting rod would be displaced by a percentage of total stroke length less than or equal to at least one of the following:

1.2% over a 30° range of crank angles;
4.7% over a 60° range of crank angles;
10.0% over a 90° range of crank angles;
16.5% over a 120° range of crank angles.

These numbers correspond to roughly 50% of the PPD in the simulated conventional engine, CONV.

Thus, an improved crankshaft, an improved internal combustion engine, and an improved motorized vehicle have been disclosed. While specific embodiments and applications have been shown and described, it would be apparent to those skilled in the art that many more modifications are possible without departing from the inventive concepts herein. The invention, therefore, is not to be restricted except in the spirit of the appended claims.

What is claimed is:

1. A device comprising:
    a first gear carrying a crank pin;
    a second gear more than twice the size of said first gear and coupled in a planetary relationship with respect to said first gear such that said crank pin travels in one of a substantially triangular, quadrilateral and pentagonal paths.

2. The device of claim 1 wherein said device is one of a compound crankshaft, an internal combustion engine, and a motorized vehicle.

3. The device of claim 2 further comprising a piston coupled to said crank pin whereby said crank pin traces out a path having a relatively long flattened portion.

4. The device of claim 2 further comprising a piston coupled to said crank pin whereby said crank pin traces out a path having a relatively long extremely flattened portion.

5. A device comprising:
    a cylinder;
    a piston reciprocating within said cylinder and defining a combustion space;
    fuel at least partially combusted in said space during a main burning period;
    a first gear carrying a crank pin coupled to said piston;
    a second gear meshing with said first gear such that said crank pin traces out a path having a relatively long flattened portion which overlaps at least in part with said main burning period; and
    wherein said crank pin traces out one of a substantially triangular, quadrilateral, and pentagonal paths.

6. A device comprising: several adjacent units, each comprising
    a cylinder;
    a piston reciprocating within said cylinder and defining a combustion space;
    fuel at least partially combusted in said space during a main burning period;
    a first gear carrying a crank pin coupled to said piston;
    a second gear meshing with said first gear such that said crank pin traces out a path having a relatively long flattened portion which overlaps at least in part with said main burning period; and
    wherein said first gear revolves about a central axis, and said device further comprises a connector piece which rotates about said central axis and couples at least two of adjacent said first gears.

* * * * *